United States Patent [19]

Chen

[11] Patent Number: 5,347,836
[45] Date of Patent: Sep. 20, 1994

[54] CONFIGURATION OF AUTOMOBILE STEERING WHEEL LOCKING DEVICES

[76] Inventor: Tian-Yuan Chen, No. 95-4, Min-Hsiang Street, Chung-Ho, Taipei Hsien, Taiwan

[21] Appl. No.: 106,847

[22] Filed: Aug. 16, 1993

[51] Int. Cl.⁵ .............................................. B60R 25/02
[52] U.S. Cl. ......................................... 70/209; 70/226
[58] Field of Search ................ 70/209, 211, 212, 225, 70/226, 237, 238

[56] References Cited

U.S. PATENT DOCUMENTS

| | | | |
|---|---|---|---|
| 5,052,201 | 10/1991 | Liou | 70/209 |
| 5,055,823 | 10/1991 | Fuller | 70/209 X |
| 5,095,723 | 3/1992 | Lin | 70/209 |
| 5,138,853 | 8/1992 | Chen | 70/238 X |

Primary Examiner—Lloyd A. Gall

[57] ABSTRACT

An improvement in the configuration of automobile steering wheel locking devices. The automobile steering wheel locking device principally consists of components, which include a main body, grip piece, stopping bar, lock, gib, holding shaft, spring, positioning pin and a cover. The main body and grip piece are wrapped tightly around the steering wheel by the semi-circular grip sections on the lower parts of the main body and grip piece forming a circular arc-shaped housing. In addition, the stopping bar at the rear of the main body is employed and confined to the corner against the windshield in front of the dashboard, thereby preventing the steering wheel from being turned and achieving optimum anti-theft effects.

1 Claim, 6 Drawing Sheets

CONFIGURATION OF AUTOMOBILE STEERING WHEEL LOCKING DEVICES

DESCRIPTION OF THE INVENTION

The present invention concerns an improvement in the configuration of automobile steering wheel locking devices, and, more particularly, a locking device that wraps around the upper part of a steering wheel, can be locked automatically and is confined to the corner against the windshield in front of the dashboard.

As shown in FIG. 1, conventional automobile steering wheel locking devices principally consist of a main body 10, with the inside of one end thereof being equipped with a steel ball 11, spring 12 and stopping plate 13, the lower side of said main body 10 being equipped with a hook 15 and the inside of said main body being equipped with an extension bar 16. Additionally, the front of said extension bar 16 is equipped with a hook 160, and the surface of said extension bar 16 possesses several ring-shaped grooves 161. Moreover, said main body 10 functions as a stopping arm. As shown in FIG. 2, a steering wheel locking device with said configuration can be locked onto the steering wheel by means of the hooks, which involves placing said steering wheel locking device on top of the steering wheel, placing the hook 15 on the lower part of said main body 10 onto the steering wheel, opening the lock with a key, extending said extension bar 16 so that the hook 160 thereof is secured against the opposite inner side of the steering wheel, and turning the key to the original position to complete the locking operation. The surface of said extension bar 16 is equipped with several ring-shaped grooves 161 for preventing said extension bar 16 from sliding into the main body 10 and ensuring that the hook 160 on said extension bar 16 grips onto the steering wheel securely. Furthermore, the stopping arm of the main body 10 limits the degree that the steering wheel can be turned.

However, the aforesaid automobile steering wheel locking device employed currently is subject to the following drawbacks:

1. In order to lock onto the two inner sides of the steering wheel, said main body 10 and extension bar 16 must possess hooks 15 and 160 respectively, requiring welding, and the surface of said extension bar 16 must be machined to form the ring-shaped grooves 161, thereby increasing the manufacturing cost.
2. The steering wheel can still be turned, because the operation principal involves the extension of said main body 10 being held by the windshield or the driver's leg.
3. The locking operation is cumbersome and not automatic, because both the locking and unlocking steps require the use of a key to turn the lock.

In light of the fact that conventional automobile steering wheel locking devices are subject to the aforementioned drawbacks, the inventor of the present invention arrived at the present invention after conducting diligent research aimed at improving said locking devices.

The principal objective of the present invention is to present an automobile steering wheel locking device that grips onto the steering wheel securely, can be locked automatically and is confined to the corner against the windshield in front of the dashboard for completely preventing the steering wheel from being turned.

The present invention is characterized principally by the fact that the upper part of the main body is equipped with a cavity, with two inner sides each being equipped with an insertion hole, that the front of said main body possesses a slot way which is at a right angle with said cavity, with the front of said slot way being equipped with a positioning hole, that one side of said main body is equipped with a lock hole that penetrates into said cavity, that the locking device pertaining to the present invention includes a grip piece which forms a union with the front of said main body and possesses a cotter bar protruding from the rear of said grip piece, that said cotter bar is to be inserted into the slot way in the front of said main body for joining the grip piece with the main body, that said locking device includes a gib which is to be inserted into the cavity of said main body, that the front of said gib, which slopes downward, is equipped with a stop plate, with one side being beveled and the other side being a flat surface, that the top of said gib possesses an opening, with the lower side of the crest of said gib being equipped with two circular holes one on each side of said opening, that said locking device includes a holding shaft, which rests on the two insertion holes in the main body and possesses an insertion hole, and that said locking device also includes a spring, which is to be inserted into said holding shaft, with one end being held by the insertion hole of said holding shaft and the other end being held by the upper surface of said gib.

A preferred practical example including figures is described below for explaining the technical means employed for achieving the aforesaid merits and objectives pertaining to the present invention.

As shown in FIG. 3, the automobile steering wheel locking device pertaining to the present invention includes a main body 2, with the upper part thereof being equipped with a cavity 21. Additionally, each of the two sides of said cavity 21 is equipped with an insertion hole 210. The front of said main body 2 possesses a slot way 22 which is at a right angle with said cavity 21. The front of said slot way 22 is equipped with a positioning hole 23, and the right side of said main body 2 is equipped with a lock hole 24 that penetrates into said cavity 21. The lower side of said main body 2 possesses a semi-circular grip piece 25, and a stopping bar 26 is welded onto the rear of said main body 2. Said locking device pertaining to the present invention also includes a grip piece 3, which forms a union with the front of said main body 2. The lower side of said grip piece 3 possesses a semi-circular grip piece 30, and said grip piece 3 is equipped with a cotter bar 31 protruding from the rear thereof. The upper side of said cotter bar 31 possesses several rabbets 310. One side of said rabbets 310 has a vertically-cut surface 3100, while the other side has a tapered surface 3101. In addition, the lower side of said cotter bar 31 possesses a slot 32 at an appropriate central location. A lock 4 is inserted into said lock hole 24 of said main body 2, and said lock 4 possesses a round rod 41 protruding from the rear of a turning piece 40. Said locking device pertaining to the present invention also includes a gib 5 with a shape shown in FIG. 3, which is to be inserted into said cavity 21. The front of said gib 5, which slopes downward, is equipped with a stop plate 50, with one side being a beveled surface 51 and the other side being a flat surface 52. In addition, the top of said gib 5 possesses an opening 53, with the lower side of the crest of said gib 5 being equipped with two circular holes 54 one on each side of said opening 53. Said locking device pertaining to the present invention also includes a holding shaft 6, which rests on the two insertion holes 210 of said main body 2 and possesses an insertion hole 60 on one side, and a spring 7, which is to be inserted into said holding shaft 6, with one end being held by the insertion hole 60 of said holding shaft 6 and the other end being held by the upper surface of said gib 5. A holding pin 8 is inserted into the positioning hole 23 in the slot way 22 on the under side of said main body 2, and is allowed to protrude from said positioning hole 23 up to an appropriate height. A cover 9 is placed on said cavity 21 of said main body 2.

Said locking device pertaining to the present invention shown in FIG. 3 is assembled in the following manner. Said spring 7 and gib 5 are inserted onto said holding shaft 6, and one end of said spring 7 is placed inside the insertion hole 60 of said holding shaft 6, and the other end of said spring 7 is placed on the upper surface of said gib 5. Next, the two ends of said holding shaft 6 are inserted into the two insertion holes 210 in said main body 2. The lock 4 is placed inside said lock hole 24, with the round rod 41 protruding from the rear of said lock 4 resting on on the upper side of the rear of said gib 5. Afterward, said cover 9 is placed on said cavity 21 of said main body 2. Finally, said cotter bar 31 of said grip piece 3 is inserted into the slot way 22 of said main body 2, and said holding pin 8 is inserted into said positioning hole 23 in such a manner that allows the upper end of said holding pin 8 to protrude into the slot 32 on the lower side of said cotter bar 31, as shown in FIGS. 4 and 5.

As shown in FIGS. 5, 6 and 7, during the locking operation (i.e., when placing said locking device onto the steering wheel), the stop plate 50 on the front of said gib 5 rests on the rabbet 310 of said cotter bar 31, because the force from the spring 7 causes the gib 5 to rest against the lower side of the round rod 41 of said lock 4. Under this configuration, a stop is formed between the flat surface 52 of the stop plate 50 and the vertically-cut surface 3100 of said rabbet 310, thereby not allowing the grip piece 3 to be pulled out. Meanwhile, the beveled surface 51 of said gib 5 and the tapered surface 3101 of said rabbet 310 of said cotter bar 31 come into contact in such a manner that allows said cotter bar 31 to be pushed inward until the main body 2 and grip piece 3 wrap tightly around the steering wheel. The steering wheel is prevented from being turned by means of said stopping bar 26, which is confined to the corner against the windshield in front of the dashboard, thereby achieving the objective of preventing thieves from turning the steering wheel.

As shown in FIGS. 5 and 6, the unlocking operation in which said cotter bar 31 is to be pulled out (i.e., when removing said locking device from the steering wheel) simply involves turning the lock 4 approximately 90° with a key, which causes the round rod 41 at the rear of said lock 4 to rotate eccentrically and push against said gib 5. As a result, said holding shaft 6 becomes a supporting shaft for said gib 5, causing the front thereof to move upward, placing the spring 7 in a compression state and allowing the stop plate 50 to be released from the rabbet 310 of said cotter bar 31. Accordingly, the grip piece 3 can be pulled out, allowing said locking device to be removed easily from the steering wheel. Said grip piece 3 is prevented from falling out from the main body 2 and causing accidents by means of said holding pin 8 situated in the slot 32 on the lower side of said cotter bar 31.

As clearly shown in the aforesaid practical example, the automobile steering wheel locking device pertaining to the present invention is more practical than conventional automobile steering wheel locking devices and possesses the following merits:
1. Said locking device pertaining to the present invention grips tightly onto the steering wheel and prevents it from being turned.
2. Said gib 5 can be removed from and inserted into said rabbet 310 reliably, allowing the locking and unlocking operations to be performed simply and accurately.
3. Simple components are employed and the assembly procedure is not complicated. In addition, said locking device pertaining to the present invention can be locked automatically without requiring a key.
4. Said grip piece 3 is prevented from falling out from the main body 2 and causing accidents.

Figure 1:
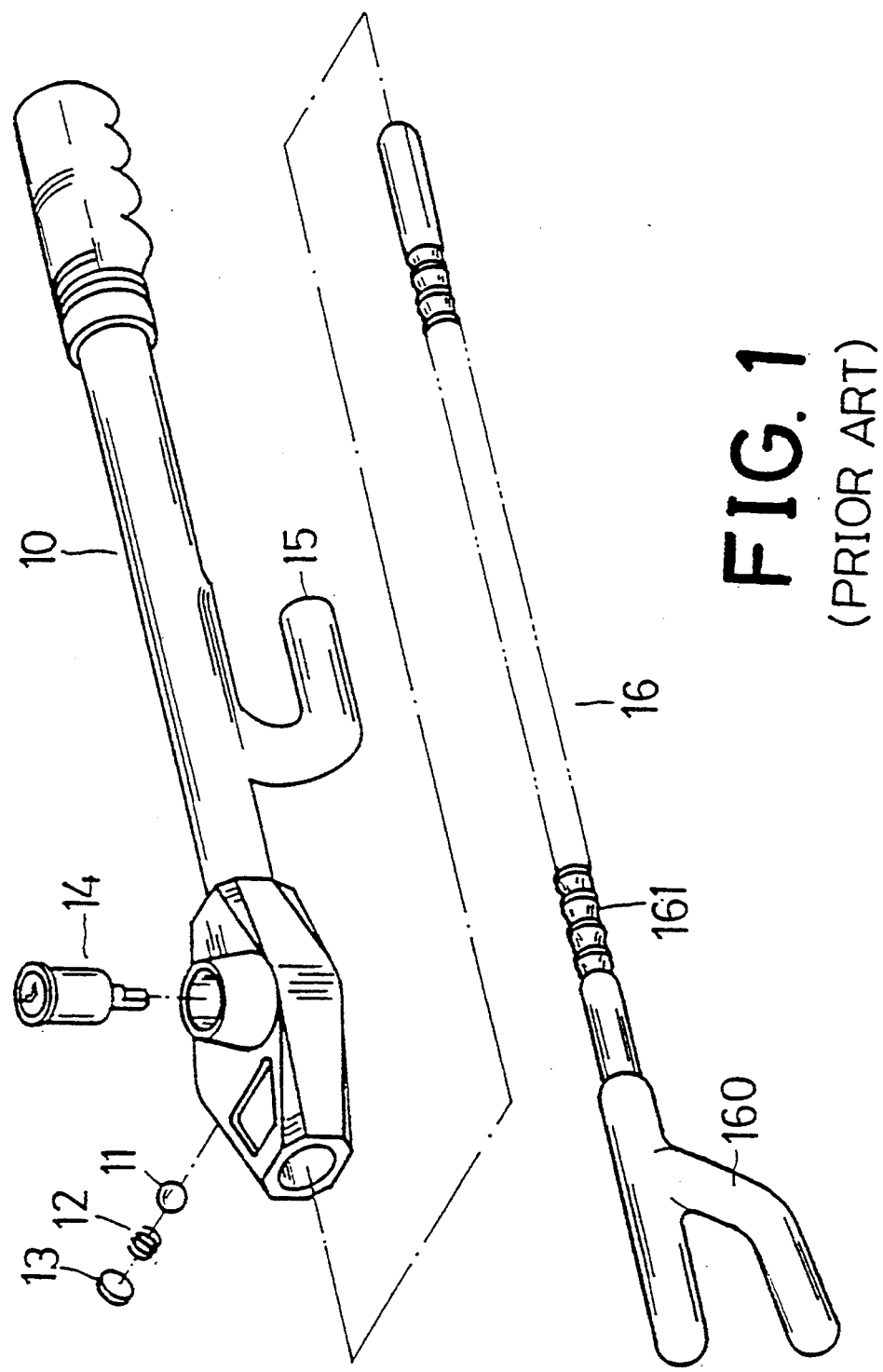
FIG. 1: A drawing showing a conventional automobile steering wheel locking device.
Figure 2:
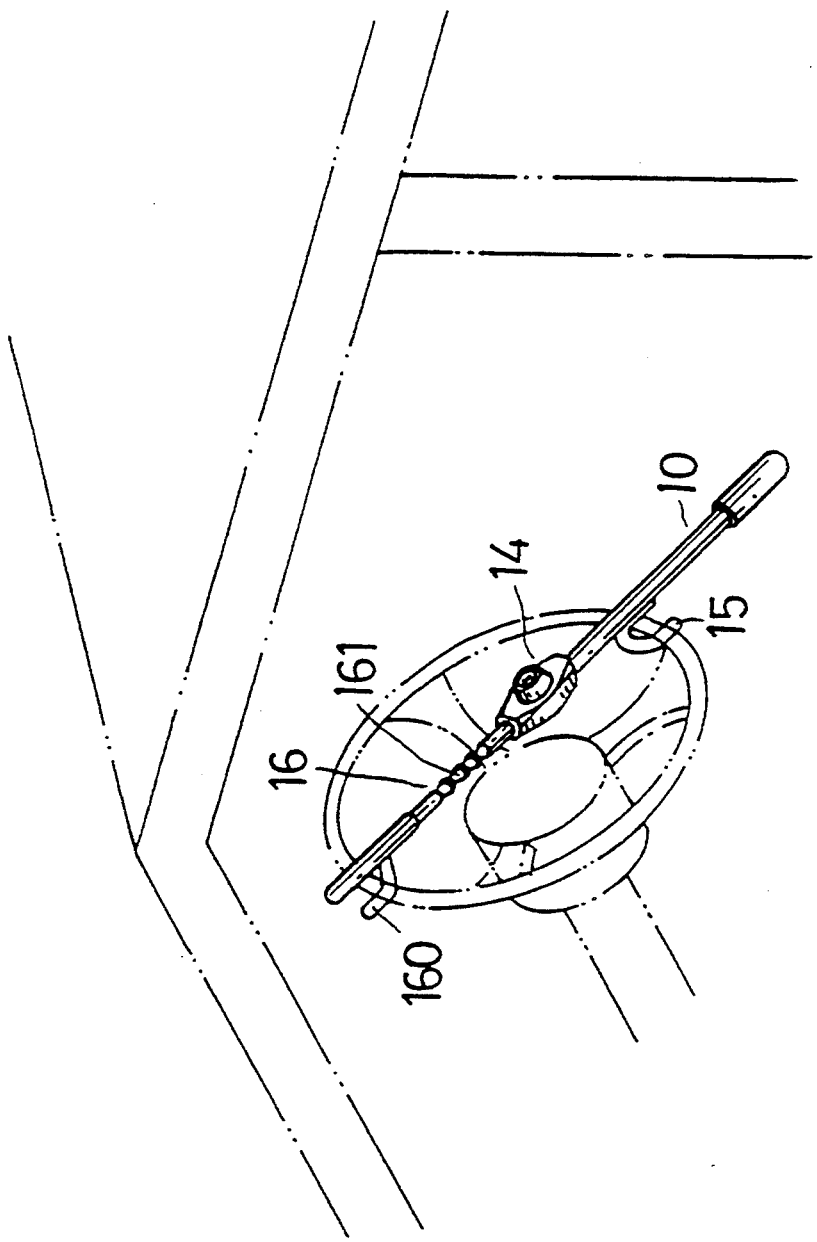
FIG. 2: A drawing showing the employment of a conventional automobile steering wheel locking device.
Figure 3:
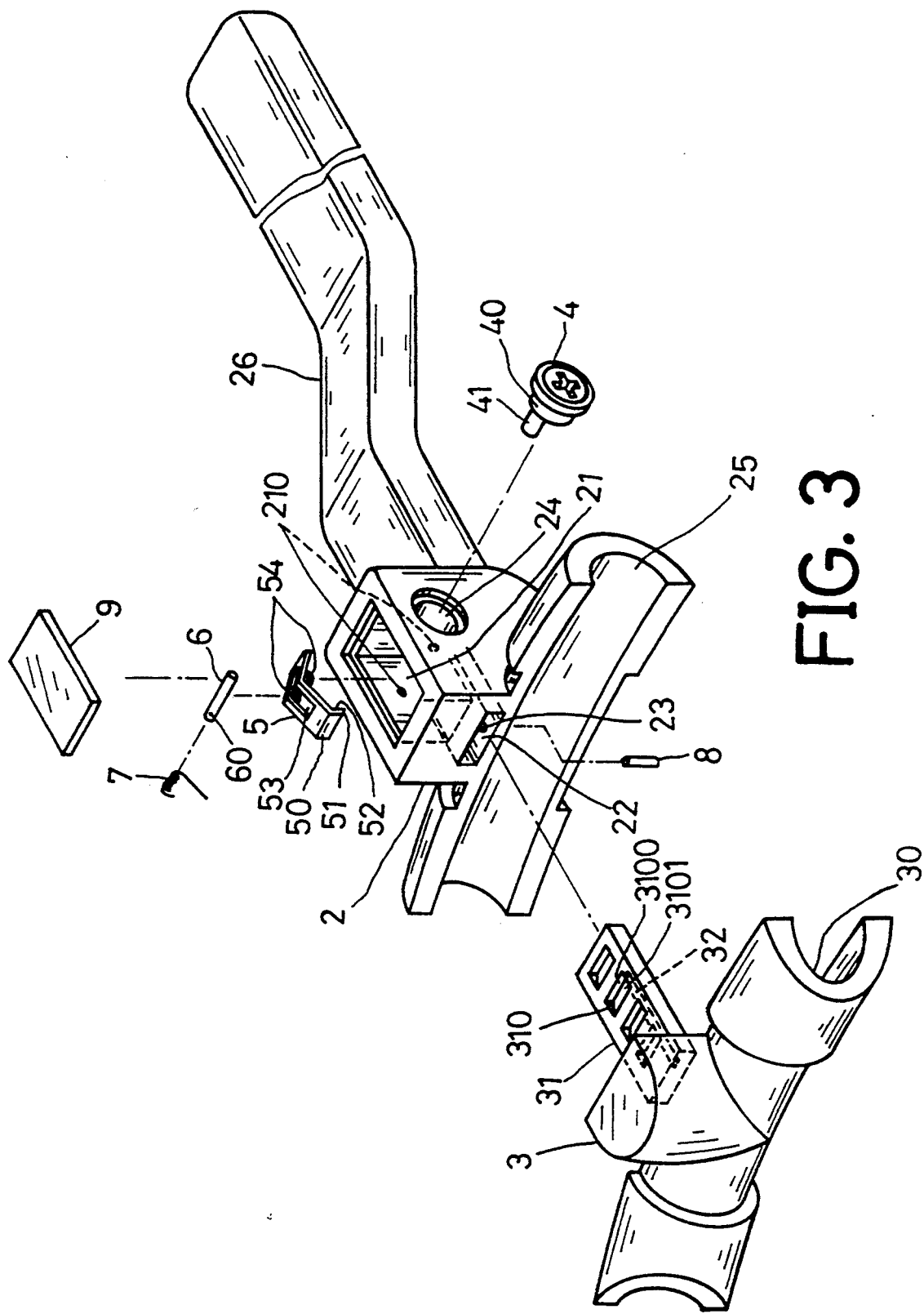
FIG. 3: A drawing showing a practical example pertaining to the present invention.
Figure 4:
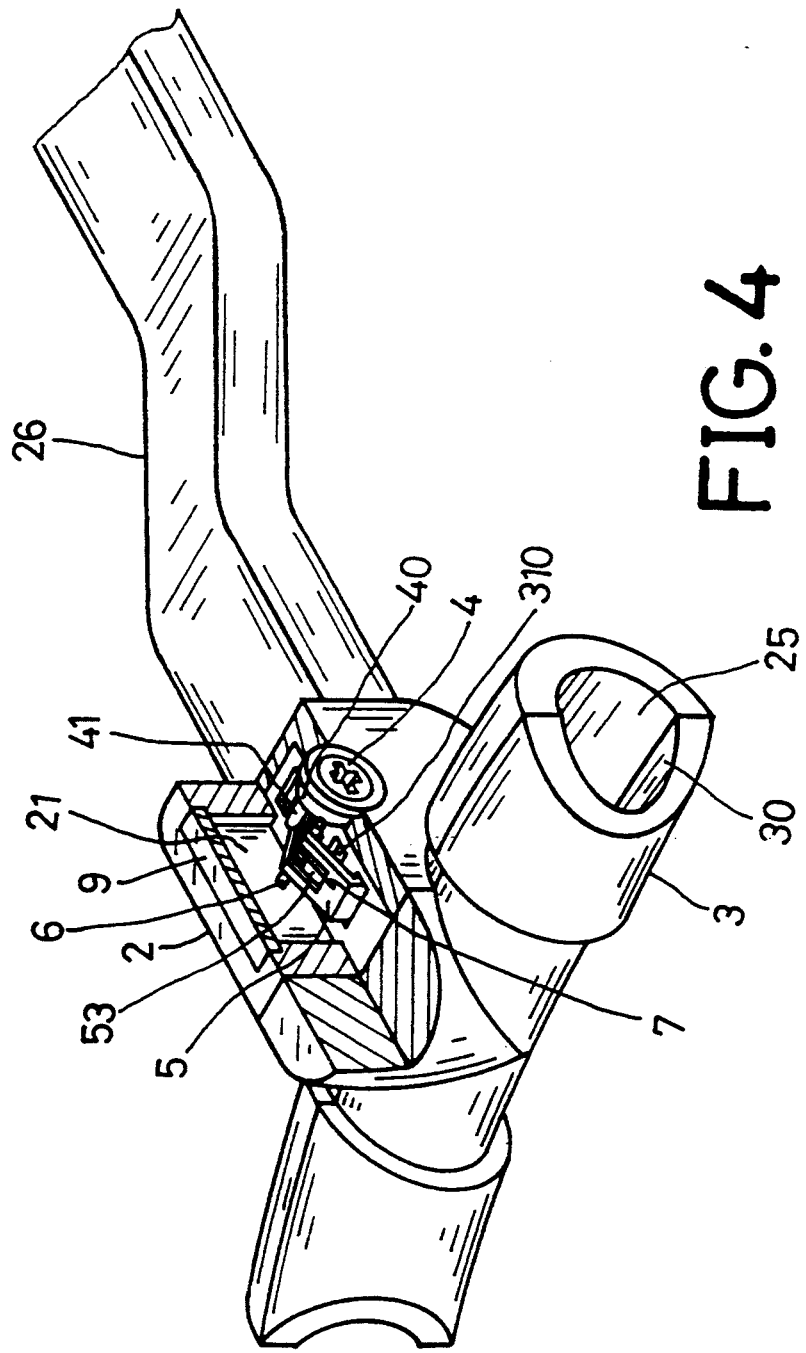
FIG. 4: A view of the components pertaining to the practical example of the present invention.
Figure 6:
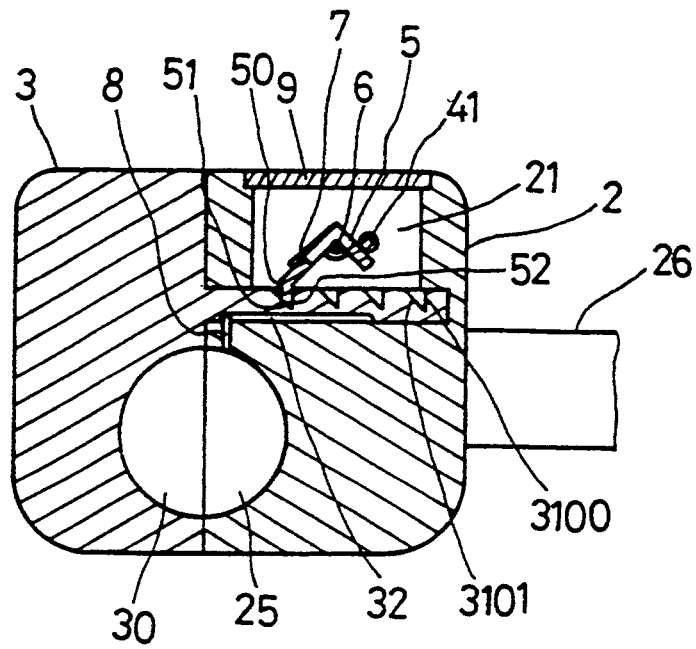
FIG. 6: A dissection drawing showing the locking state pertaining to the practical example of the present invention.
Figure 5:
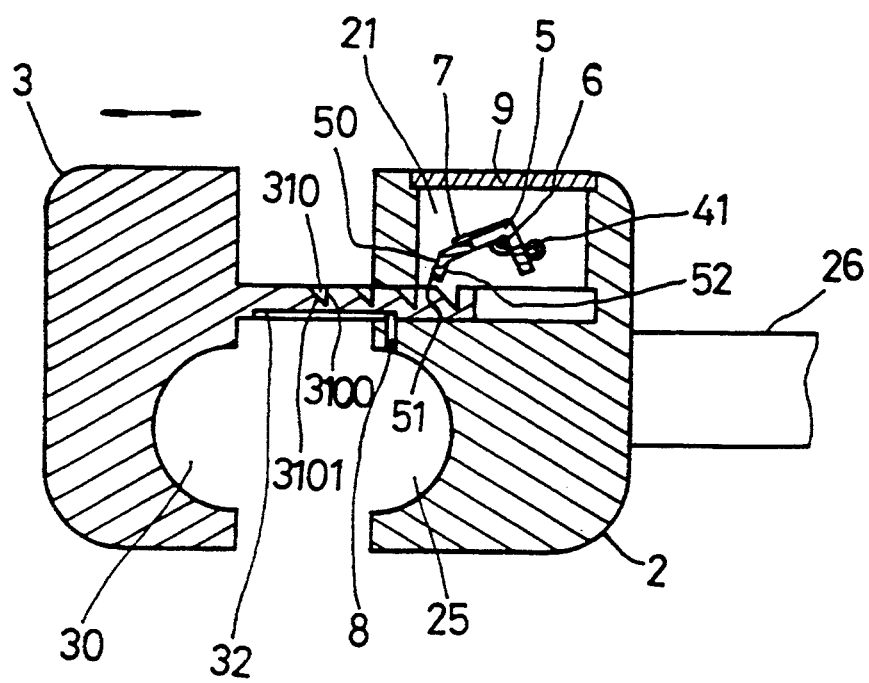
FIG. 5: A dissection drawing showing the un-locking state pertaining to the practical example of the present invention.
Figure 7:
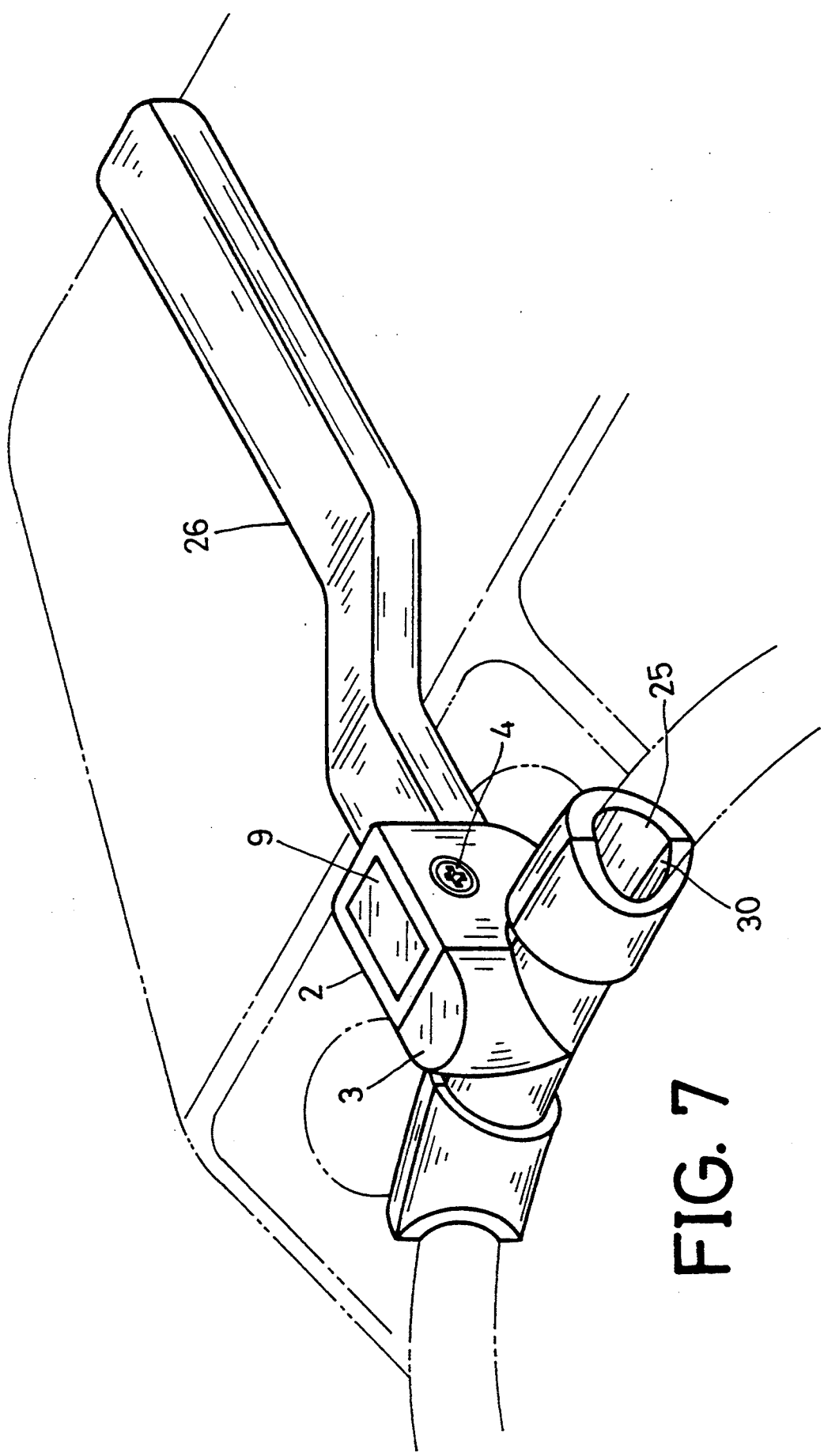
FIG. 7: A drawing showing the employment of the automobile steering wheel locking device pertaining to the practical example of the present invention.

I claim:
1. A locking device for an automobile steering wheel comprising:
  (1) a main body equipped with a semi-circular grip section on a lower part thereof, a lock hole on a side thereof and a stopping bar welded at a rear thereof,
  (2) a grip piece for forming a union with a front of said main body, including a semi-circular grip section on the lower part thereof, a cotter bar protruding from the rear thereof, multiple rabbets on the upper side of said cotter bar, a beveled surface on one side of said rabbets and a vertical flat surface on the other side thereof, and a slot way on the under side of said cotter bar,
  (3) a lock placed inside the lock hole of the main body, equipped with a round rod extending from a rear of a turning piece of said lock,
  (4) a holding pin inserted into a positioning hole in a slot way of the main body, and
  (5) a cover placed on the upper part of the main body, characterized by the facts that;
  the upper part of the main body includes a cavity, with two inner sides each including an insertion hole, the slot way on a front of said main body is at a right angle to said cavity,
  said locking device including a gib which is inserted into the cavity of said main body, the front of said gib, which slopes downward, includes a stop plate, with one side being beveled and the other side being a flat surface, the top of said gib including an opening, with the lower side of a crest of said gib including two circular holes, said locking device also including a spring, which is inserted into a holding shaft, with one end of said spring being held by said holding shaft and the other end of said spring being held by the upper surface of said gib, and that the employment of said locking device requires only pushing the grip piece so that (a) the main body and grip piece are wrapped tightly around an automobile steering wheel by means of the semi-circular grip sections on the lower parts of the main body and grip piece forming a circular arc-shaped housing and (b) optimum anti-theft effects are achieved by means of the stopping bar at the rear of said main body being confined to a corner defined by a windshield and a dashboard, thereby preventing the steering wheel from being turned.

* * * * *